Dec. 13, 1927.
A. HERMAN
GARDEN TOOL
Filed Nov. 21, 1925
1,652,478
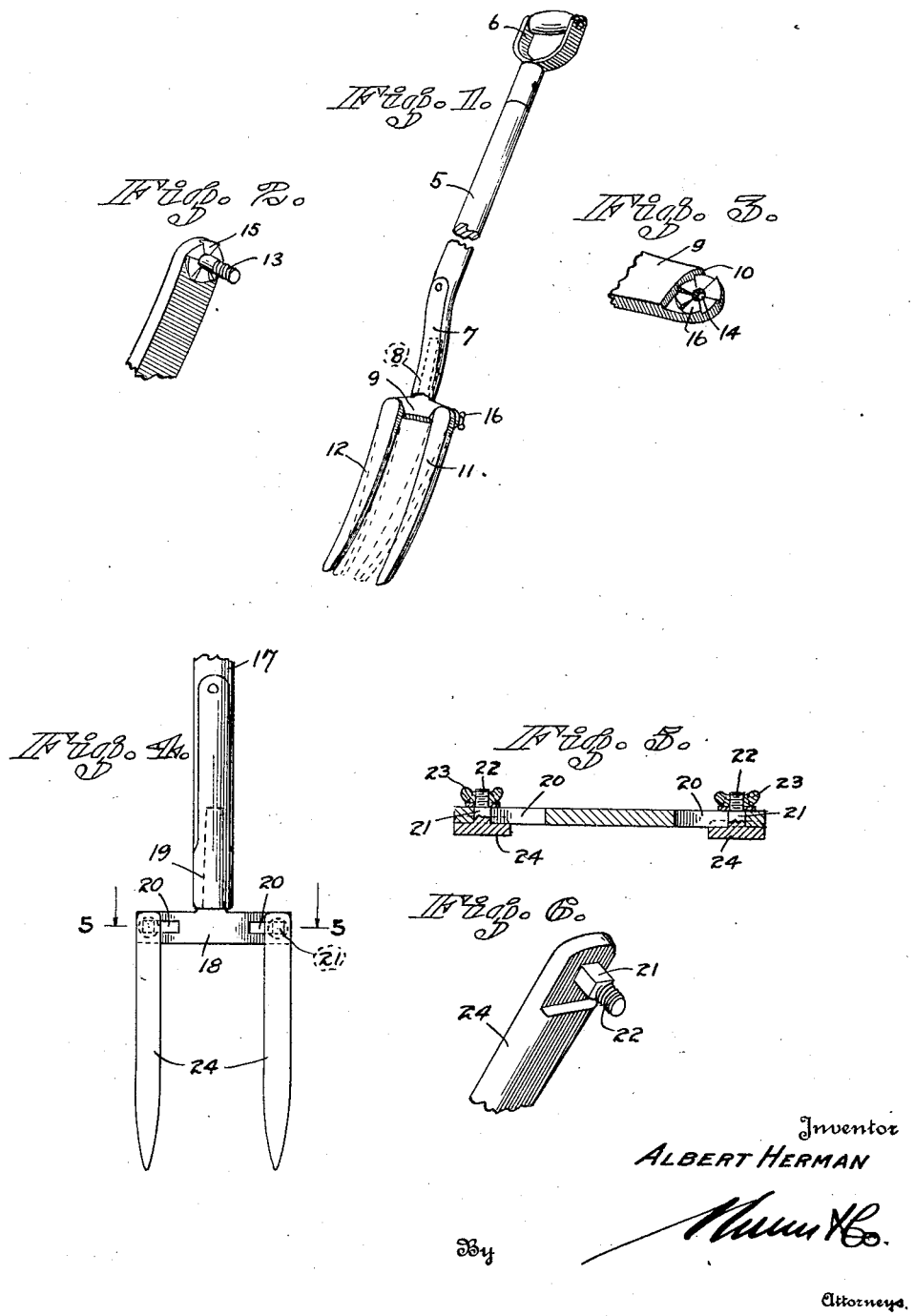
Inventor
ALBERT HERMAN
By
Attorneys.

Patented Dec. 13, 1927.

1,652,478

UNITED STATES PATENT OFFICE.

ALBERT HERMAN, OF OAKLAND, CALIFORNIA.

GARDEN TOOL.

Application filed November 21, 1925. Serial No. 70,600.

The general object of the present invention is to provide a garden tool adapted to be used as a hand cultivator in loosening the soil around and between closely arranged plants as, for instance, those growing in a flower bed, without causing damage to the plants by uprooting the same.

The above and other objects are accomplished by instrumentalities pointed out in the following specification.

The invention is clearly defined in the claim.

A satisfactory embodiment of the invention is illustrated in the accompanying drawings forming part of the specification and in which Figure 1 is a contracted perspective of one embodiment of the invention.

Figure 2 is a fragmentary perspective of one of the tines of the form shown in Figure 1 and looking at the rear thereof.

Figure 3 is a fragmentary perspective in plan of the base of the form shown in Figure 1.

Figure 4 is a detail front elevation of the lower end portion of a modified form of cultivator.

Figure 5 is a transverse section on the line 5—5 of Figure 4, and

Figure 6 is a fragmentary perspective of one of the tines shown in Figure 4.

The cultivator of the present invention comprises a handle portion which includes a shank 5 terminating at one end in a hand hold 6. The opposite end portion of the shank is reinforced by a ferrule 7 and is provided with a socket. The device of the present invention comprises a shank, shown by dotted lines in Figure 1 and indicated by 8, which is forced into the socket in one end of the shank 5. The outer end of the shank 8 is provided with a transverse base 9 which is relatively short and oblong and at its opposite end portions reduced in thickness, one of such end portions being shown in Figure 3 and indicated by 10. The reduced end portions provide bearings for the inner ends of a pair of tines 11 and 12, the rear faces of which are integrally provided with screw threaded studs 13 adapted to pass loosely through openings in the reduced end portions 10, one of such openings being shown in Figure 3 and indicated by 14. The opposed bearing surfaces of the tines and reduced end portions 10 are integrally provided with circular rows of teeth, indicated by 15 and 16 in Figures 2 and 3 respectively. The said teeth 15 and 16 are adapted to interfit and thereby interlock the loose fit of the stud 13 permitting angular adjustments of the tines, and the teeth operating to lock the tines in any of their adjusted positions. In order to prevent detachment of the tines from the base, suitable nuts, one of which is shown in Figure 1 and indicated by 16, are screwed upon the studs 13 and operate to prevent disengagement of the teeth 15 and 16. With this construction the tines 11 and 12 may be adjusted laterally with respect to each other for any required distance according to the character of the bed in which it is desired to use the tines. In Figure 1 the full line position of the parts shows the same adjusted for operating between plants disposed relatively far apart, while the dotted line position indicates an adjustment for working the ground between plants set relatively close together.

In the modified form shown in Figure 4, the shank 17, a portion of which is shown, corresponds in construction to the shank 5. The base 18 of the modified form is provided with a shank 19 fitting tightly into the socket of shank 17, as shown by dotted lines in Figure 4. The base 18 approximates in dimensions the base 9, and its opposite end portions are provided with longitudinally disposed slots 20 of rectangular contour. The slots 20 receive the non-cylindrical portions 21 of studs and permit sliding movement of the portions 21 therein. The portions 21 terminate in screw threaded extensions 22 for the reception of clamp nuts 23 which operate to secure the studs in any of their adjusted positions. The studs are located at the upper ends of tines 24, corresponding in contour to the tines 11 and 12 and extending in the same general direction as the handle, and as shown by the tines 11 and 12 of Figure 1.

With the construction shown in Figure 4, the tines may be bodily adjusted laterally so as to vary the intervening space and for the purpose described in connection with the form shown in Figure 1 and when adjusted as shown in Figure 4, the tines are clamped against displacement by turning the nuts 23 upon the screw threaded extensions 22 of the studs.

From the foregoing it is obvious that the tool of the present invention is ideally adapted for use in a garden and especially for the cultivation of flower beds where the use of a cultivator of relatively great width would be prohibitive on account of its liability to uproot the plants in loosening the soil therearound. It will be further observed that the device is extremely simple in construction and inexpensive to manufacture.

Although I have shown and described one embodiment of my invention, it is to be understood that the same is susceptible of various changes; and I reserve the right to employ such as may come within the scope of the appended claim.

I claim:

A garden tool comprising a handle having a transversely disposed cross bar at its lower end, said cross bar provided with longitudinal slots, a pair of tines supported by said cross bar and having studs extending through the respective slots to permit sliding movement of the tines, and means associated with the studs for clamping the tines to said cross bar.

ALBERT HERMAN.